United States Patent [19] [11] 3,928,704
Heidingsfeld et al. [45] Dec. 23, 1975

[54] METHOD FOR PRODUCING THIN-WALLED ARTICLES FROM PLASTICS

[75] Inventors: Viktor Heidingsfeld; Slavko Hudeček; Jaroslav Hnídek; Jan Kolařík; Jiři Zelinger, all of Prague, Czechoslovakia

[73] Assignee: Ceskoslovenska akademie ved, Prague, Czechoslovakia

[22] Filed: June 24, 1974

[21] Appl. No.: 482,641

Related U.S. Application Data

[62] Division of Ser. No. 302,898, Nov. 1, 1972, Pat. No. 3,875,261.

[30] Foreign Application Priority Data
Nov. 5, 1971 Czechoslovakia ............ PV7797-71

[52] U.S. Cl. .......... 428/260; 260/2.5 P; 260/2.5 M; 260/899; 427/373; 427/246; 428/304; 428/310; 428/904
[51] Int. Cl.².. B32B 7/00; D04H 3/12; D04H 13/00
[58] Field of Search.... 117/161 UF, 161 UH, 119.6; 260/2.5 P, 2.5 M, 899; 427/373, 246; 428/904, 260, 304, 310

[56] References Cited
UNITED STATES PATENTS
3,576,686  4/1971  Schmidle ........................ 260/2.5 M
3,709,725  1/1973  Schabel et al. ................ 117/161 UF
3,767,633  10/1973  Dietrich ........................ 117/161 UF Primary Examiner—Mayer Weinblatt

[57] ABSTRACT

Thin-walled articles produced from plastics applied to a fabric support or prepared without a fabric support by casting, coating or dipping, particularly plastic leathers with improved hygienic properties, such as permeability for air, water vapors and absorption of moisture. A hydrophilic filler or mixture of such fillers, together with a liquid or mixture of liquids which cause the filler to swell and which act as a physical blowing agent above their b.p. (60° – 140°C), are added to the processed material. The processed material may be based on poly(vinyl chloride), vinyl chloride copolymers or their mixtures, containing the usual plasticizers, stabilizers, lubricants, pigments and other additives. The filler is based upon synthetic cross-linked water-insoluble macromolecular compounds capable of reversibly binding water due to their polar groups, as for example, hydroxyl, amide, carboxyl, sulfohydroxyl or quaternary ammonium groups.

12 Claims, No Drawings

METHOD FOR PRODUCING THIN-WALLED ARTICLES FROM PLASTICS

This is a divisional application of Ser. No. 302,898, filed Nov. 1, 1972, now U.S. Pat. No. 3,875,261.

BACKGROUND OF THE INVENTION

Thin-walled articles, namely foils or textiles coated with plastics, are produced on a large scale, particularly for use in the clothing industry, and for the manufacture of upholstering, shoes, fancy articles and other purposes. These articles are, as a rule, called plastic leathers and resemble natural leather mainly in appearance and some physico-mechanical properties, but not in their composition, structure and hygienic properties. The plastic leathers recently produced have a negligible permeability for air and water vapor and also a very low reversible absorption of moisture in comparison with natural leather.

Efforts to achieve the required hygienic properties in plastic leathers have been attempted since these materials were used as a substitute for natural leather. The first attempts to gain the desired permeability utilized purely mechanical methods. They were based upon the additional perforation of the prepared plastic leathers by needles. Later attempts used an electro-spark discharge for perforation of plastic leathers. However, the resulting increase of permeability was only minimal. Another mechanical method for increasing the permeability utilized the drawing of a plastic leather between rollers so that the originally compact surface is broken by numerous small cracks and splits. This method is however useful only for some purposes, because any further surface finishing is rather limited. In another process the use of a support layer formed from brushed textile having a pile penetrating through a coating plastic layer of plastics was proposed. However, the permeability obtained by the aforesaid methos was in all respects insufficient. Further, there were also described methods based upon use of additives to the prepared leather which may be subsequently washed out from the leather prepared to thus obtain continuous microporour structure. A porous plastic leather with a definite degree of permeability can be prepared using some chemical blowing agents, e.g. azo-bis-isobutyronitrile. Also physical blowing agents may be used for this purpose, as finely dispersed water or water applied on a carrier, e.g. bentonite.

The enhanced absorption of moisture was also achieved by a choice of a suitable textile support or by its containing some natural and modified hydrophilic fillers, e.g. methylcellulose or starch, which increase the wettability of the resulting plastic leather. However, these experiments were not too successful due to the undesirable absorption capacity of the fillers used and to their rather limited efficiency in the compact layer of plastics.

The values of permeability and wettability of the plastic leather, which were obtained by the aforementioned methods, are insufficient for most purposes and do not provide results commensurate to the exerted endeavour.

DESCRIPTION OF THE PREFERED EMBODIMENTS

The invention relates to a method for producing thin-walled articles from plastics by coating, casting or dipping, wherein a hydrophilic filler or a mixture of hydrophilic fillers based upon synthetic cross-linked macromolecular compounds insoluble in water and containing polar groups able to reversibly bind water, preferably hydroxyl, amide or carboxyl and sulfohydroxyl groups in the $H^+$ form, or in $Na^+$, $Li^+$, $Ca^{++}$ and $Ba^{++}$ form, or quaternary ammonium groups in $OH^-$, $Cl^-$ or $SO_4H^-$ form, is added, together with a liquid or a mixture of liquids, preferably an azeotropic mixture, having a boiling temperature in the region between 60° and 140°C, and which swells the hydrophilic filler, in a minimal amount of 10 percent by weight (based upon the filler), to the processed material, comprising a poly(vinyl chloride) paste, copolymers based upon vinyl chloride, a mixture of poly(vinyl chloride) homopolymers, a mixture of poly(vinyl chloride) with a copolymer based upon vinyl chloride, and the usual plasticizers, stabilizers, lubricants, pigments and like additives.

The filler may be wetted by the aforesaid liquid before it is mixed into the processed material or the liquid may be added during preparation of the processed material or introduced into the prepared paste. The largest applicable amount of the aforesaid liquid, or mixture of liquids used depends, on the amount and sorption capacity of the filler and therefore the upper limit cannot be given. Water, lower aliphatic alcohols or a mixture of water with lower aliphatic alcohols are advantageously used for this purpose. The hydrophilic filler is advantageously added in the amount of 5 to 50% by weight of the processed material.

The paste prepared in such a way is processable by the conventional methods into a suitable thin-walled formation. The liquid or mixture of liquids used is evaporated by heating the mixture to a temperature close to the boiling point of the liquid. This forms fine open pores in the layer of paste, in which pores the particles of the hydrophilic filler accumulate. By heating up to a gelation temperature, the paste sets without closing of the pores. When the paste has a suitable composition, i.e. when a slowly setting polymer or plasticizers having a higher critical dissolving temperature is used, the period of expansion of the absorbed liquid at the lower temperature may be omitted and the expansion and gelation can be carried out at the same time.

The open pores, formed by the present method, provide for a transport of water vapor to the particles of the hydrophilic filler. They also do not prevent the filler from expanding during the sorption of vapors. Almost complete utilization of the absorption capacity of filler can be achieved in this way. At the same time, the open pores enable the transport of air and water vapor through the layer of plastics, i.e. provide for its permeability.

The invented method can be combined with usual methods of blowing or forming by means of chemical blowing agents, thereby allowing for a further decrease of specific weight of the plastic coating, without disadvantageously affecting the permeability or wettability.

The method for producing a plastic leather with hygienic properties, according to this invention, is very simple and can be carried out with the usual equipment used for the production of current artificial leathers. The method can be advantageously used for production of clothing, upholstery, shoes and similar material. Permeable materials characterized by their high wettability are formed by the aforesaid method, and have hygienic properties similar to, or even exceeding, that of natural leather. The permeability, wettability and structure of the plastic coating can be controlled over a broad range by means of the type and amount of the hydrophilic fillers used on the one hand, and the type and amount of the liquid or mixture of liquids used for expansion, on the other. Various requirements with respect to hygienic properties and appearance of the leather produced can thus be met.

The following several examples of performance will further illustrate the invention, without, however, limiting its scope. All amounts are given in parts by weight.

EXAMPLE 1

A paste of the following composition was prepared in a planetary blender:
- 55 parts of an emulsion of gelatinous poly(vinyl chloride) having a K value 71
- 20 parts of dioctyl phthalate
- 15 parts of dioctyl adipate
- 7 parts of dibutyl phthalate
- 3 parts of epoxybutyl ester of soya-bean oil
- 20 parts of cross-linked poly(methacrylic acid) containing 40% of water
- 1.5 parts of dibutyltin dilaurate
- 1.5 parts of stearic acid
- 1.3 parts of carbon black
- 0.2 parts of low-molecular-weight polyethylene wax.

Powdery additives and the hydrophilic filler were introduced batchwise by metering into a plastifier. The formed paste was then homogenized on a friction three-bowl calender and deaerated. The deaerated paste was then applied to a patterned support in a spreading machine and the coat thus produced was laminated to a knit cotton material. The coat was then expanded by heating to 95° and gelled at 170°C.

The expanded coat is characterized by very fine, uniform and predominantly open pores. Permeability of the plastic leather prepared in this way is 2.9 mg/cm$^2$/hr, wettability is 10.7%. The respective surface finish is formed with an overpaint which does not influence the permeability (e.g. polyurethane or polyamide varnish). This plastic leather is suitable above all for clothing purposes.

EXAMPLE 2

A paste was prepared consisting of:
- 50 parts of gelatinous vinyl chloride — vinyl acetate copolymer (5% of VAc) with K value 69
- 10 parts of butyl benzyl phthalate
- 20 parts of diisooctyl phthalate
- 15 parts of dioctyl sebacate
- 5 parts of epoxidized linseed oil
- 1 part of cadmium stearate
- 0.5 parts of barium stearate
- 2 parts of titanium white
- 0.5 parts of pigment
- 20 parts of cross-linked powdered poly(2-hydroxyethyl methacrylate).

The hydrophilic filler, stabilizers and pigment were introduced batchwise by metering into a plastifier to the paste during preparation. The prepared paste was then blended with 15 parts of aqueous ethanol (20% of water) and after deaeration the paste was applied to the patterned silicone support and the coat laminated to a brushed polyester fabric. The coat was then expanded at 80°C and gelated at 175°C.

The expanded coat is characterized, similarly as in the preceeding example, by fine, predominantly open pores. Permeability of the plastic leather prepared in this way is 5.1 mg/cm$^2$/hr, wettability is 7.4%.

EXAMPLE 3

A prime coat of the following composition was applied to a support from needled fabric:
- 52 parts of gelatigenous poly(vinyl chloride) with K value 70
- 30 parts of di-2-ethylhexyl phthalate
- 10 parts of dioctyl adipate
- 8 parts of dibutyl phthalate
- 2 parts of lead (II) stearate
- 2 parts of pigment mixture.

This coat was pregelated and covered with a middle coat of the same composition, which contained, in addition, 6 parts of finely ground limestone. Further paste of the following composition was prepared:
- 50 parts of emulsion gelatigenous poly(vinyl chloride) with K value 75
- 21 parts of dioctyl phthalate
- 15 parts of dioctyl azelate
- 10 parts of butyl benzyl phthalate
- 4 parts of epoxidized soya-bean oil
- 1.5 parts of stearic acid
- 2 parts of lead (II) stearate
- 3 parts of pigment mixture
- 15 parts of powdered and cross-linked sodium polymethacrylate.

This paste was homogenized and 18 parts of water was added into it, the paste was deaerated and applied on the pregelated middle coat. Then the expansion was carried out at 100°C followed by gelation at 180°C. The plastic leather was finished by patterning with a pattern roller and overpainted with a polyurethane varnish.

The expanded coat is characterized, similarly as in the preceeding examples, by fine, uniform and predominantly open pores.

EXAMPLE 4

Pre-shrunk polyester fleece was impregnated with a dimethylformamide solution of polyurethane rubber of a polyester type and thereafter introduced into a water bath, where polyurethane coagulated. After washing and drying, a coat of the same composition as in EXAMPLE 2 was applied on the combined fleece, however, in this instance cross-linked polyacrylamide containing 50% of water was used as the hydrophilic filler in amount of 30 parts by weight. The coat was expanded at 95°C and gelled at 175°C and the resulting article was then patterned. The plastic leather thus prepared has a permeability of 3.1 mg/cm$^2$/hr and its absorption of moisture from the exposed side is 12.8% and therefore it is useful especially for upholstering purposes.

EXAMPLE 5

A paste of the following composition was prepared:
- 50 parts of gelatinous poly(vinyl chloride) having a K value 75
- 21 parts of dinonyl phthalate
- 15 parts of dioctyl adipate
- 10 parts of butyl benzyl phthalate
- 4 parts of epoxidized soya-bean oil
- 1.5 parts of stearic acid 2.5 parts of lead (II) stearate
3 parts of pigment mixture
1.5 parts of azo-bis-formamide
24 parts of cross-linked polymer based upon methacrylic ester of 2.3-dihydroxypropyltrimethylammonium chloride, containing 50 % of water.

This paste was applied to the auxiliary support and the coat was then laminated to a combed cotton textile. The coat was first expanded at 100°C, then gelled at 170°C and further expanded at 190°C.

The permeability of the plastic leather prepared in this way is practically negligible, however it has a high absorption of moisture from the front or side to be exposed (16.3%) and is therefore very useful for upholstering of seats in cars, armchairs, etc.

Without further analysis, the foregoing will so fully reveal the gist of the present invention that others can by applying current knowledge readily adapt it for various applications without omitting the features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A thin-walled plastic article comprising a uniform blend of an admixture of at least one hydrophilic filler based on a synthetic cross-linked water-insoluble macro-molecular compound containing polar groups capable of binding water reversibly, at least one liquid boiling in the range of 60° to 140°C and effective to swell said hydrophilic filler selected from the group of water and lower aliphatic alcohols, and a vinyl chloride plastisol type resin material selected from the group of polyvinylchloride, copolymers of vinyl chlorid and mixtures thereof, said liquid being in an amount of at least 10% by weight referred to the hydrophilic filler, said blend being formed into an expanded jell and set into a predetermined shape.

2. A thin walled plastic article comprising a laminate formed of at least one layer of fabric and at least one layer of an expanded jell composition formed of a uniform blend of an admixture of at least one hydrophilic filler based on a synthetic crosslinked water-insoluble macromolecular compound containing polar groups capable of binding water reversibly, at effective to swell said hydrophilic filler selected from the group of water and lower aliphatic alcohols, and a vinyl chloride plastisol type resin material selected from the group of polyvinylchloride, copolymers of vinyl chloride and mixtures thereof, wherein said liquid is used in an amount of at least 10% by weight referred to the hydrophilic filler.

3. The article according to claim 2 wherein said jell is set into a predetermined shape.

4. Method for making a thin-walled plastic article comprising admixing at least one hydrophilic filler based on a synthetic cross-linked water-insoluble macromolecular compound containing polar groups capable of binding water reversibly, at least one liquid boiling in the range of from 60° to 140°C and effective to swell said hydrophilic filler selected from the group of water and lower aliphatic alcohols, and a vinyl chloride plastisol type resin material selected from the group of polyvinylchloride, copolymers of vinyl chloride and mixtures thereof, wherein said liquid is used in an amount of at least 10% by weight compared to the hydrophilic filler, to form a uniform blend thereof, applying said blend onto at least one layer of fabric to form a laminate, heating said laminate to expand the material forming said blend and heating said laminate to cause jelling of said material forming said blend.

5. The method according to claim 4 which comprises carrying out said expansion by heating said laminate to a temperature of from 80° to 100°C.

6. The method according to claim 4 which comprises carrying out said jelling by heating said laminate to a temperature of from 170° to 190°C.

7. The method according to claim 4 wherein said hydrophilic filler is based on a synthetic cross-linked water insoluble macromolecular compound containing hydroxyl, amide, carboxyl or sulfohydroxyl groups in $H^+$, $Na^+$, $Li^+$, $Ca^{++}$, or $Ba^{++}$ form or quaternary ammonium groups in $OH^-$, $Cl^-$ or $SO_4H^-$ form.

8. The method according to claim 4 wherein said liquid is first mixed with said filler and the resulting mixture admixed with said vinylchloride plastisol resin material.

9. The method according to claim 4 wherein said hydrophilic filler is used in an amount of 5 to 50% by weight of the total of said blend.

10. The method according to claim 4 wherein said vinylchloride plastisol resin material additionally contains at least one member of the group of plasticizers, stabilizers, lubricants and pigments.

11. The method according to claim 4 wherein said liquid is a mixture of water and a lower aliphatic alcohol.

12. The method according to claim 4 wherein said liquid comprises an azeotropic mixture.

* * * * *